(12) United States Patent  (10) Patent No.: US 6,578,624 B2
Auvity  (45) Date of Patent: Jun. 17, 2003

(54) HEATING AND/OR AIR-CONDITIONING APPARATUS, PARTICULARLY FOR A MOTOR VEHICLE

(75) Inventor: Michel Auvity, Velizy (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 10/086,883

(22) Filed: Mar. 4, 2002

(65) Prior Publication Data

US 2002/0125331 A1 Sep. 12, 2002

(30) Foreign Application Priority Data

Mar. 2, 2001 (FR) .............................. 01 02872

(51) Int. Cl.⁷ ................................................ B60H 1/12
(52) U.S. Cl. ......................................... 165/42; 62/244
(58) Field of Search ............................. 62/244; 165/42, 165/43; 237/12.3 B (56) References Cited

U.S. PATENT DOCUMENTS 4,320,628 A * 3/1982 Okajima ...................... 62/186
4,681,153 A * 7/1987 Uchida ........................ 165/202
4,898,325 A * 2/1990 Sakurada ............... 237/12.3 B
5,154,223 A * 10/1992 Ishimaru et al. .............. 165/42
6,009,934 A    1/2000 Sunaga et al. ................. 165/42

FOREIGN PATENT DOCUMENTS

DE    35 26 518 A1    4/1986
DE    198 16 329 A1   10/1999
EP    0 507 120 A2    10/1992

* cited by examiner

Primary Examiner—William E. Tapolcai
(74) Attorney, Agent, or Firm—Liniak, Berenato & White (57) ABSTRACT

A heating and air-conditioning apparatus for the cabin of a motor vehicle. The apparatus includes a chassis within which air flows and equipped with an air-blowing mechanism and heating and cooling units for cooling and heating the air and a member for controlling the heating unit. At least one airflow duct communicates with the chassis, and at least one mixing shutter, with a variable degree of openness, controls the air stream towards the duct. The mixing shutter is arranged in the overall direction of the air flow downstream of the heating member and transmits additional air passing through the heating unit when the fresh air passage is wide open, and governs in an intermediate position of closure of the air flowing through the heating unit. The mixing shutter also switching a control member controlling the operation of the heating unit between an off and on position.

9 Claims, 5 Drawing Sheets

HEATING AND/OR AIR-CONDITIONING APPARATUS, PARTICULARLY FOR A MOTOR VEHICLE

BACKGROUND OF THE INVENTION

1. Field of the Invention

The invention relates to a heating and/or air-conditioning apparatus particularly for the cabin of a motor vehicle.

2. Discussion of the Related Art

In motor vehicle heating and/or air-conditioning units of the prior art, it is known practice to use an air blowing member, typically a blower, placed upstream of a heating system, typically made up of an evaporator/radiator, allowing the air expelled by the blower to be heated up by heat exchange. In general, a liquid such as water flows around inside the radiator under the control of a progressive valve. These members are placed in succession in a chassis inside which the air flows towards one or more ducts that convey air into the cabin.

In addition, a fresh air passage is conventionally formed on the wall of the chassis, outside of the radiator, and a hinged mixing shutter is provided to partially or fully open or close this passage so as to transmit fresh air towards the ducts, or not as the case may be.

Control of the temperature of the air conveyed to the ducts is managed by a central unit which controls the valve and the shutter operating in concert. Thus, in a first state, when only hot air is required, the valve is in a wide open operating position and the shutter is closed. All of the air therefore passes through the radiator. When warm air is required, in a variable operating state, the shutter is partially opened and the radiator valve governs the temperature of the water circuit so as to provide warm air which mixes with the fresh air. The progressive nature in raising or lowering the temperature is assisted by the valve. Finally, when only cold air is required in a second extreme state, the valve shuts off the water circuit and the fresh air passage shutter is wide open.

This solution is not satisfactory, particularly for economical reasons, because of the high cost of the progressive valve and the significant pressure drops in the liquid which are created by the valve when it is open.

SUMMARY OF THE INVENTION

The object of the invention is to allow good control over the progressive nature of the temperature for an appreciably lower cost.

To do that, provision is made for the complex valve to be replaced by a simple valve, coupled to means of mixing the air from the fresh air passage and from the radiator.

More specifically, the subject of the invention is heating and/or air-conditioning apparatus particularly for the cabin of a motor vehicle, having: a chassis within which air flows, this chassis being equipped with an air-blowing means and with a means for cooling and heating the air, which operates using a fluid flowing through it, a member for controlling the heating means, at least one air flow duct communicating with the chassis, and at least one mixing shutter with a variable degree of openness for allowing the air stream towards the duct.

In this apparatus, the member controlling the heating means is of the on/off type and the mixing shutter is arranged, in the overall direction of air flow, downstream of the heating member, particularly facing a heating surface of the heating means.

Advantageously, in an intermediate position of the air flow through the heating means being shut off, the mixing shutter governs the switching of the member controlling the heating means between the on and off modes.

According to a first particular embodiment, the fresh air passage is defined between a wall of the chassis and a side wall of the heating means. The arrangement having the following characteristics:

two operating states are considered, a first state in which the heating means (valve open) is on and the mixing shutter opens the fresh air passage to the intermediate position, and a second state in which the heating is off and the shutter pivots beyond the intermediate position to allow additional fresh air to pass through the switched-off heating means (valve closed);

when the shutter is in a first extreme position, the control member is in the on position and the shutter closes off the fresh air passage so that the air blown passes only through the heating means to form a hot air stream directed towards the duct;

between the first position and the intermediate position of the shutter in the first state, the control member remains in the on position and the shutter allows a variable fresh air stream to pass through the passage according to the orientation of the shutter, and also lets through a hot air stream from the heating means so that these streams mix as they head for the duct;

when the shutter reaches the intermediate position, the control member switches to the off position and the shutter prevents air from the heating means from flowing so that the air blown passes only through the fresh air passage; and between the intermediate position and a second extreme position of the shutter in the second state, and in this second position, the control member remains in the off position and the shutter is directed toward the heating means so that additional fresh air passes through the heating means, now off, bound for the duct and adds to the fresh air stream coming from the passage.

According to an alternative form of the embodiment:

aside from the mixing shutter, the apparatus comprises an additional shutter also arranged downstream of the heating means, so that the two shutters are capable, in a given position, of closing off the flow of air passing through the heating means, and:

between a first position and before reaching a second position of the mixing shutter, the first state is defined by the mixing shutter switching from the fresh air passage being closed so that the blown air passes only through the heating means to form a hot air stream bound for the duct, to variable opening of the fresh air passage then in collaboration with the additional shutter so as to allow a hot air stream from the heating means to pass so that these streams mix as they head for the duct;

when the mixing shutter reaches the second position, the control member switches to the off position and the additional shutter being arranged in a first closed position, the shutters then collaborate to shut off the flow of air from the heating means so that the air blown passes only through the fresh air passage; and between this first and a second position of the additional shutter, the mixing shutter remaining in its second position and the control member in the off position, the second state is defined by an opening of the air passage through the heating means, now off, which provides additional fresh air bound for the duct and adds to the fresh air stream coming from the fresh air passage.

According to another embodiment, a fresh air passage is provided between a wall of the chassis and a side wall of the heating means. The arrangement having the following characteristics:

the mixing shutter controls the shutting-off of the air flow through the heating means in a closed position, this flow passage being opened variably outside of this position;

the apparatus further comprises an additional shutter arranged in the chassis in such a way as to close off the fresh air passage in a closed position and to open this passage variably outside of this position;

the mixing shutter being in the closed position and the additional shutter in the open position, the control member of the heating means is in the off mode and the air blown passes only through the fresh air passage;

the mixing and additional shutters being outside of the closed positions, the control member of the heating means is in the on mode and the additional shutter allows a fresh air stream to pass through the passage and the mixing shutter allows a hot air stream from the heating means to pass so that these streams mix as they head for the duct;

the mixing shutter being outside of the closed position and the additional shutter in the closed position, the control member is in the on mode so that the blown air passes only through the heating means so as to form a hot air stream bound for the duct; and when the shutters are in the open position, the control member is in the off mode so that additional fresh air passes through the heating means, now off, bound for the duct and adds to the fresh air stream coming from the passage.

Another subject of the invention is a vehicle equipped with heating and/or air-conditioning apparatus as described previously.

BRIEF DESCRIPTION OF THE DRAWINGS

The invention will be better understood and other features, details and advantages thereof will become more clearly apparent from reading the description which follows, given by way of example with reference to the appended drawings in which.

DETAILED DESCRIPTION OF THE PREFERRED EMBODIMENTS

Figure 1A:
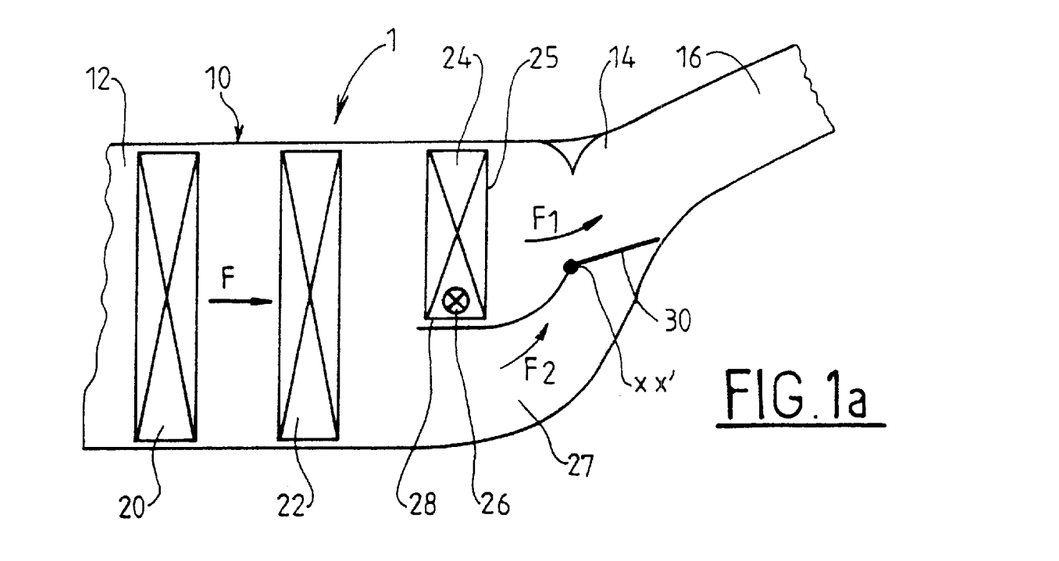
FIGS. 1a, 1b and 1c are views in cross section of a heating and/or air-conditioning apparatus according to the invention comprising a mixing shutter depicted in three operating positions.

Reference is made first of all to FIG. 1a to describe a heating and/or air-conditioning apparatus 1 for a motor vehicle cabin. This apparatus 1 includes an outer chassis 10, for example made of plastic, having an upstream part 12 typically connected to a vehicle dashboard (not depicted) and a downstream part 14 communicating with a duct 16.

An air blowing member 20, such as a blower, together with an evaporator 22 and a radiator 24, are mounted one beside the other in the chassis 10, the evaporator 22 being mounted upstream of the radiator 24 and downstream of the blower 20 in the direction of flow of the air illustrated by the arrow F.

The radiator 24 has at least one downstream heating surface 25. It operates on a fluid such as water flowing through it in such a way as to form an indirect exchanger of heat with the water. It is equipped with a control member 26 of on/off type, such as a valve so as to switch the radiator from off to on and vice versa.

A fresh air passage 27 is formed between a wall of the chassis 10 and an edge 28 of the radiator 24 and serves for the flow of air from the evaporator 22 which covers the entire cross section of the chassis 10.

A mixing shutter 30 is arranged facing the heating surface 25 of the radiator 24 and is hinged about an axis xx' perpendicular to the plane of section of FIG. 1.

In all the examples mentioned hereinafter, the switch in state of the valve is controlled directly by the angular position of the mixing shutter 30.

Figure 1B:
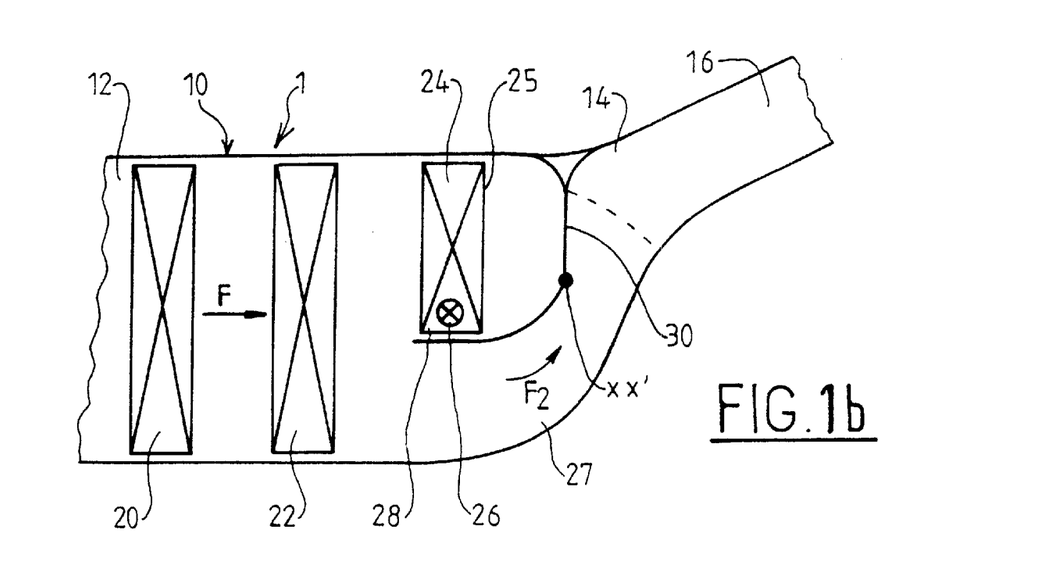
Figure 1C:
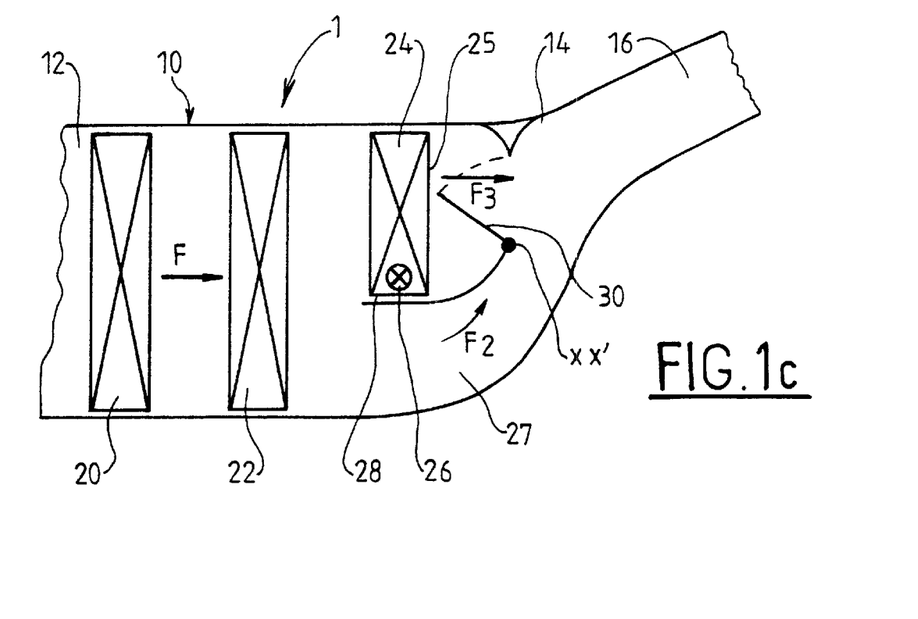

This shutter 30 can adopt a first extreme position illustrated in FIG. 1a, a second intermediate position illustrated in FIG. 1b, and a third extreme position illustrated in FIG. 1c.

In its first extreme position, the mixing shutter 30 shuts off the fresh air passage 27 and governs the valve 26 in such a way that it is in the position of switching the radiator 24 on. Thus, a hot air stream (arrow F1) only passes through the chassis 10 and the radiator 24 bound for the duct 16. This is the position for maximum heating.

Between the first extreme position and the second intermediate position of the mixing shutter 30, the valve 26 remains in its on position. The fresh air stream F2 passing through the passage 27 and the hot air stream F1 from the radiator 24 mix as they head for the duct 16. This is the position of heating modulated with air the warmth of which varies with the angular position of the shutter 30.

When the shutter 30 reaches the second intermediate position illustrated in FIG. 1b, it mechanically, or electro-mechanically with the aid of a relay, governs the switching of the valve 26 from the position in which the radiator 24 is on to the position in which the latter is off. In this position, only the fresh air stream F2 flows through the duct 16, the air passing through the radiator being shut off at the shutter 30. This is the normal fresh air position.

Finally, between the second intermediate position and the third extreme position of the shutter 30, and in this third position illustrated in FIG. 1c, the valve 26 remains in the off position and the shutter is inclined towards the heating surface 25 of the radiator 24 so that additional fresh air (arrow F3) passes through the radiator, now off, and is added to the fresh air stream F2 coming from the passage 27. This is the maximum fresh air position.

Figure 2A:
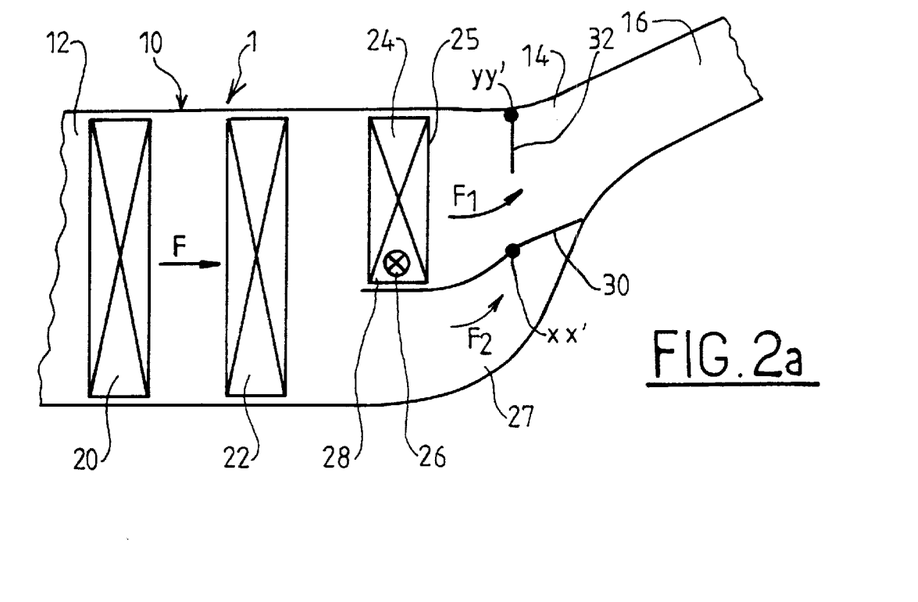
FIGS. 2a, 2b and 2c are views in cross section of a second embodiment of the present invention having an additional shutter depicted in various operating positions.
Figure 2B:
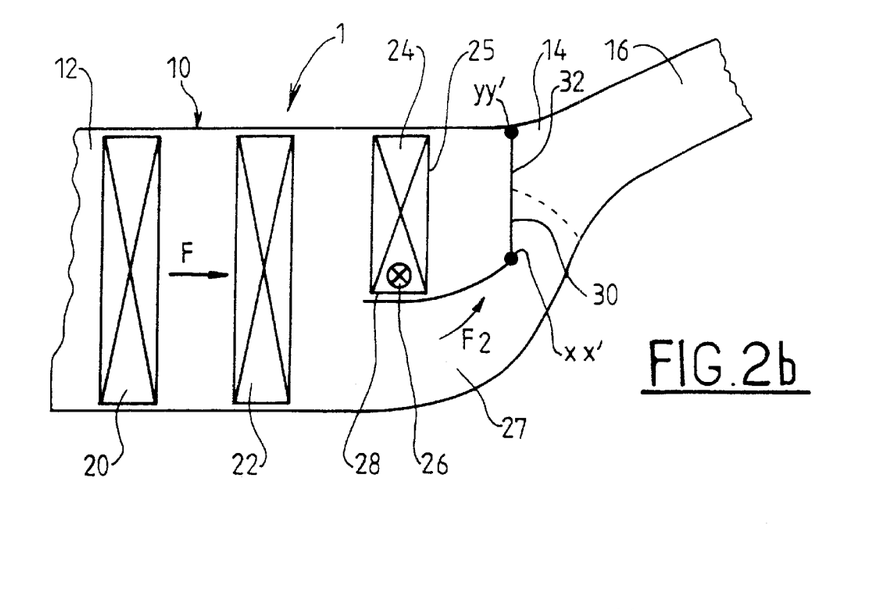
Figure 2C:
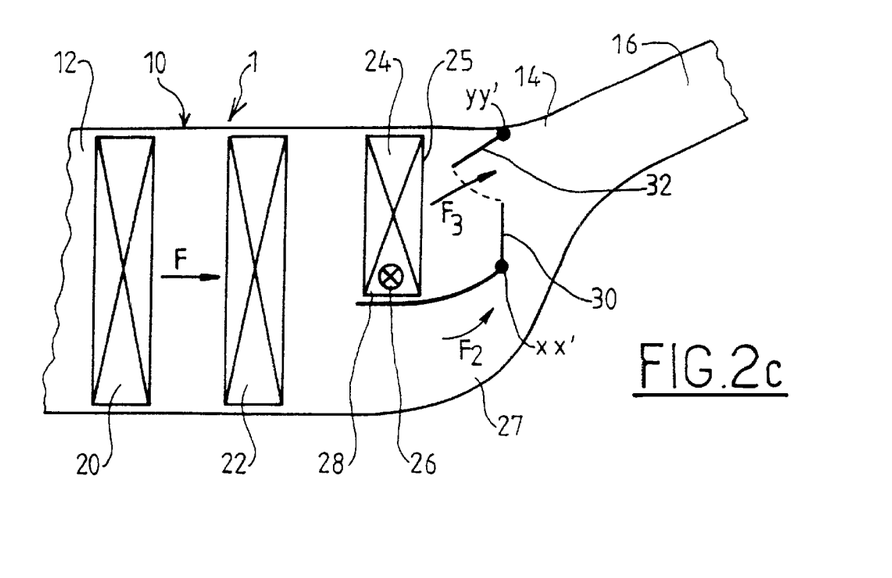

In FIGS. 2a to 2c, the mixing shutter 30 operates in concert with an additional shutter 32 mounted to pivot about an axis yy' situated near the wall of the chassis 10, the additional shutter 32 being arranged facing the downstream heating surface 25 of the radiator 24, like the mixing shutter 30. This additional shutter 32 can adopt a first extreme position illustrated in FIGS. 2a and 2b, and a second extreme position illustrated in FIG. 2c.

In FIG. 2a, the mixing shutter 30 is in its first position in which it shuts off the fresh air passage 27 and governs the valve 26 in such a way that it is in the position that switches the radiator 24 on. Thus, a hot air stream (arrow F1) only passes through the chassis 10 and the radiator 24 bound for the duct 16. The additional shutter 32 is preferably in its first extreme position, although it may be in its second extreme position. This is the position for maximum heating.

Between the first position and the second position of the mixing shutter 30, the valve 26 remains in its on position. The fresh air stream F2 passing through the passage 27 and the hot air stream F1 from the radiator 24 mix as they head for the duct 16. The position of the additional shutter once again is of little importance here. This is the modulated heating position.

When the shutter 30 reaches the second position illustrated in FIG. 2b it mechanically, or electromechanically with the aid of a relay, governs the switching of the valve 26 from the position in which the radiator 24 is on to the position in which the latter is off. The additional shutter 32 for its part is in its first extreme position. In this position, only the fresh air stream F2 from the passage 27 flows through the duct 16, the air passing through the radiator 24 being shut off at the shutters 30 and 32. This is the normal fresh air position.

Finally, between the first extreme position and the second extreme position of the additional shutter 32, and in this second position illustrated in FIG. 2c and called, the valve 26 remains in the off position and the additional shutter is inclined to some extent towards the heating surface 25 of the radiator 24 so that additional fresh air illustrated by the arrow F3 passes through the radiator, now off, and is added to the fresh air stream F2 from the passage 27. This is the maximum fresh air position.

An alliterative form of embodiment, not depicted, includes arranging the axis yy' of the additional shutter 32 more or less at the end of the mixing shutter 30, when the latter is in its second position illustrated by FIGS. 2b or 2c.

Figure 3A:
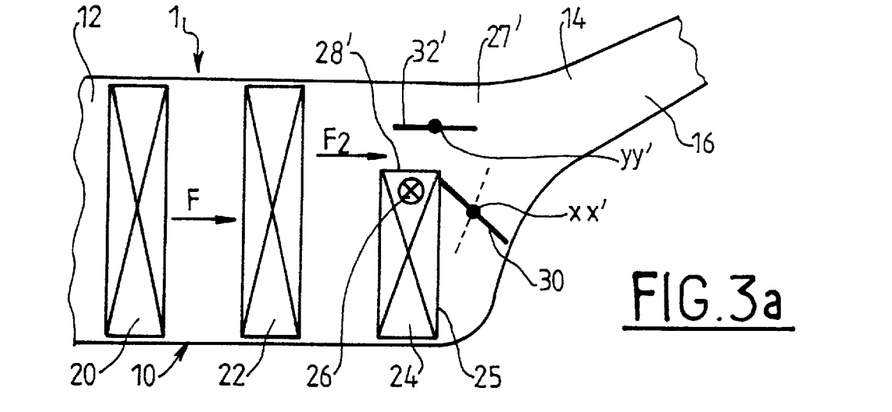
FIGS. 3a and 3b are views in cross section of an alternative embodiment of FIGS. 2a, 2b and 2c.
Figure 3B:
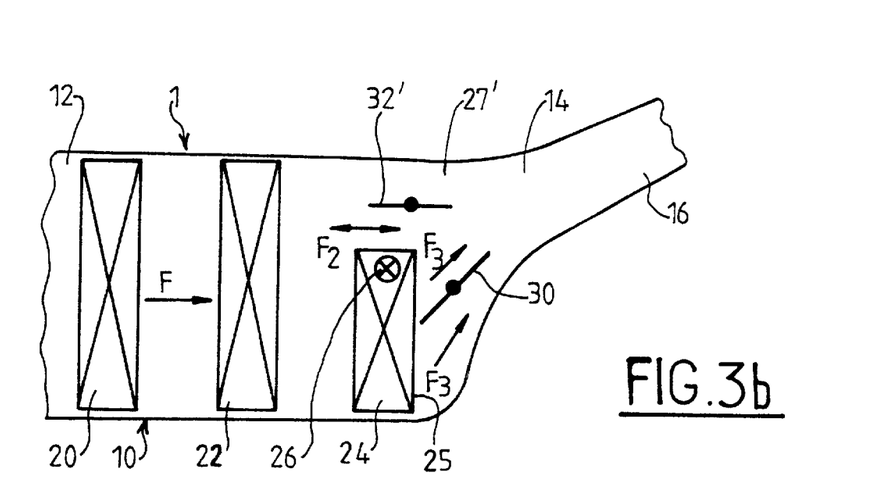
Figure 3C:
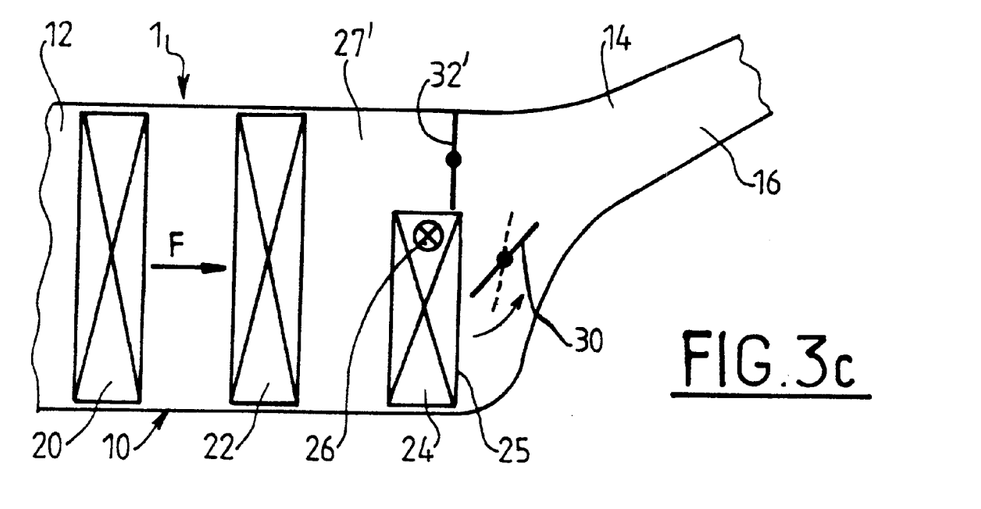

The alternative form of embodiment illustrated in FIGS. 3a to 3c also involves a mixing shutter 30 and an additional shutter 32'. A fresh air passage 27' is arranged between the wall of the chassis 10 and an edge 28' of the radiator 24, above the radiator 24.

In FIG. 3a, the mixing shutter is in its first position and the additional shutter 32' is in its second. With the apparatus in this state, the valve 26 is in its position for which the radiator 24 is off and only a fresh air stream (arrow F2) passes through the passage 27' bound for the duct 16. This is the normal fresh air function.

When the mixing shutter leaves its first position and lies between this position and the second position (dotted lines in FIG. 3a), the control member 26 switches to the position of switching the radiator 24 on and a hot air stream therefore passes through the radiator and mixes with the fresh air stream F2 passing through the passage. Orientating the mixing shutter 30 makes it possible to adjust the hot air/fresh air mix bound for the duct 16. This is the modulated heating function.

When the mixing shutter switches to its second position illustrated in FIG. 3b, the control member switches to its position in which the radiator 24 is off. A fresh air stream F3 then adds to the fresh air stream F2 from the passage 27'. This additional fresh air passing through the radiator 24, now off, makes it possible to increase the rate of flow of fresh air through the duct 16. This is the maximum fresh air function.

Finally, if the additional shutter 32' switches to its first position of shutting off the passage 27', which position is illustrated in FIG. 3c, and the mixing shutter 30 fluctuates between its first and second positions, only the hot air stream F1 from the radiator reaches the duct. This is the maximum heating function, the air flow rate of which depends on the angular position of the first shutter.

By virtue of the solutions put forward, the progressive nature in terms of temperature of the heating and/or air-conditioning apparatus is better mastered and a fresh air flow rate which is higher than in the prior art comes through the duct 16 by virtue of the maximum fresh air function.

The pressure drops in the heating fluid are minimal. There is no parasitic heating when the valve 26 is in its off position and the additional fresh air is sent to the duct 16.

Thus, replacing an elaborate, expensive and more complicated valve with a simple economical valve of the on/off type and positioning one or more mixing shutters in suitable positions make this solution simple to implement, reliable, and less expensive than the solutions of the prior art.

While the foregoing invention has been shown and described with reference to a preferred embodiment, it will be understood by those possessing skill in the art that various changes and modifications may be made without departing from the spirit and scope of the invention. For example, it is possible, using a central unit, to manage the various modes of operation of the shutters, controlled for example by suitable software. Furthermore, the radiator could be of the electric or catalysis type. The person skilled in the art will be able to adapt any type of shutter, for example of the butterfly valve or flag valve type, or shut-off valve, to implement the invention. Thus, the axes of rotation of certain shutters may be offset so that they are placed either at their middle, or at one of their ends, depending on their position and on the angular travel they are to have.

What is claimed is:

1. A Heating and air-conditioning apparatus comprising:
   a chassis within which at least one of hot and cold air flows, the chassis being equipped with an air-blowing mechanism and with a cooling unit and a heating unit provided to heat and cool the air and operates by fluid flowing through said heating and cooling units;
   a control member for controlling the heating unit between an on an off mode;
   at least one air flow duct communicating with the chassis; and
   at least one mixing shutter for controlling air flow through the air flow duct;
   wherein the mixing shutter is arranged in an overall direction of the air flow downstream of the heating unit and provided to transmit additional air passing through the heating unit when a fresh air passage is in a wide open position, and governs air flow through the heating unit when in an intermediate position of closure and directly controls a switching member of the control member to directly control the heating unit discretely between the on and off modes.

2. The apparatus according to claim 1, wherein the mixing shutter is arranged facing a heating surface of the heating unit.

3. A Heating and air-conditioning apparatus comprising:
   a chassis within which at least one of hot and cold air flows, the chassis being equipped with an air-blowing mechanism and with a cooling unit and a heating unit provided to heat and cool the air and operates by fluid flowing through said heating and cooling units;
   a control member for controlling the heating unit between an on an off mode;
   at least one air flow duct communicating with the chassis; and at least one mixing shutter for controlling air flow through the air flow duct;

wherein the mixing shutter is arranged in an overall direction of the air flow downstream of the heating unit and is adapted for transmitting additional air passing through the heating unit when a fresh air passage is in a wide open position, and governs air flow through the heating unit when in an intermediate position of closure and controls a switching member of the control member to control the heating unit between the on and off modes;

the mixing shutter is arranged facing a heating surface of the heating unit; and the fresh air passage is disposed between a wall of the chassis and a side wall of the heating unit;

the apparatus operates in a first state in which the control member is on and the mixing shutter opens the fresh air passage to the intermediate position, and a second state in which the heating is off and the shutter pivots beyond the intermediate position to allow additional fresh air to pass through the switched-off heating unit;

when the mixing shutter is in a first extreme position, the control member is in the on position and the mixing shutter closes off the fresh air passage so that the air blown passes only through the heating unit to form a hot air stream directed towards the air flow duct;

between the first position and the intermediate position of the mixing shutter in the first state, the control member remains in the on position and the mixing shutter allows a variable fresh air stream to pass through the fresh air passage according to the orientation of the mixing shutter, and also lets through a hot air stream from the heating unit so that fresh air stream and hot air stream mix as they approach the air flow duct;

when the mixing shutter reaches the intermediate position, the control member switches to the off position and the mixing shutter prevents air from the heating unit from flowing so that air blown passes only through the fresh air passage; and between the intermediate position and a second extreme position of the mixing shutter in the second state, and in this second position, the control member remains in the off position and the shutter opens so that additional fresh air passes through the heating unit in an off mode, bound for the air flow duct and adds to the fresh air stream coming from the fresh air passage.

4. The apparatus according to claim 3 further comprising:
an additional shutter arranged downstream of the heating unit, so that the mixing shutter and additional shutter are capable, in a given position, of closing off flow of air passing through the heating unit; wherein between a first position and before reaching a second position of the mixing shutter, the first state is defined by the mixing shutter switching from the fresh air passage being closed so that the air blown passes only through the heating unit to form a hot air stream bound for the air flow duct, to variable opening of the fresh air passage then in collaboration with the additional shutter so as to allow a hot air stream from the heating unit to pass so that the fresh air stream and hot air stream mix as they head for the air flow duct;

when the mixing shutter reaches the second position, the control member switches to the off position and the additional shutter is arranged in a first closed position, the missing shutter and additional shutter then collaborate to shut off the flow of air from the heating unit so that blown air passes only through the fresh air passage; and between the first and a second position of the additional shutter, the mixing shutter remains in its second position and the control member remains in the off position, the second state is defined by an opening of the air passage through the heating unit in the off mode, and provides additional fresh air bound for the air flow duct and adds to the fresh air stream coming from the fresh air passage.

5. A Heating and air-conditioning apparatus comprising:
a chassis within which at least one of hot and cold air flows, the chassis being equipped with an air-blowing mechanism and with a cooling unit and a heating unit provided to heat and cool the air and operates by fluid flowing through said heating and cooling units;

a control member for controlling the heating unit between an on an off mode;

at least one air flow duct communicating with the chassis; and at least one mixing shutter for controlling air flow through the air flow duct;

wherein the mixing shutter is arranged in an overall direction of the air flow downstream of the heating unit and is adapted for transmitting additional air passing through the heating unit when a fresh air passage is in a wide open position, and governs air flow through the heating unit when in an intermediate position of closure and controls a switching member of the control member to control the heating unit between the on and off modes;

the mixing shutter is arranged facing a heating surface of the heating unit; and the fresh air passage is defined between a wall of the chassis and a side wall of the heating unit;

the mixing shutter controls air flow through the heating unit and shuts off flow therethrough in a closed position, the flow passage being opened variably outside of the closed position;

the apparatus further comprises an additional shutter arranged in the chassis in such a way as to close off the fresh air passage in a closed position and to open this passage variably outside of this position;

wherein when the mixing shutter is in the closed position and the additional shutter in the open position, the control member of the heating unit is in the off mode and the air blown passes only through the fresh air passage;

when the mixing shutter and additional shutter are outside of the closed positions, the control member of the heating unit is in the on mode and the additional shutter allows a fresh air stream to pass through the passage and the mixing shutter allows a hot air stream from the heating unit to pass so that the hot air stream And fresh air stream mix as they head for the air flow duct;

when the mixing shutter and additional shutter are in the open position, the control member is in the off mode so that additional fresh air passes through the heating unit in an off mode bound for the air flow duct and adds to the fresh air stream coming from the passage.

6. The apparatus according to claim 5, wherein the heating unit is a water-filled radiator and the control member is a valve.

7. A vehicle in combination with the heating and air-conditioning apparatus according to claim 1.

8. The apparatus according to claim 1, wherein said valve is directly controlled in relation to an angular position of said mixing shutter.

9. A Heating and air-conditioning apparatus comprising:
- a chassis within which at least one of hot and cold air flows, the chassis being equipped with an air-blowing mechanism and with a cooling unit and a heating unit provided to heat and cool the air and operates by fluid flowing through said heating and cooling units;
- at least one air flow duct communicating with the chassis; and
- at least one mixing shutter for controlling air flow through the air flow duct; said at least one mixing shutter movable between a first maximum heating position substantially preventing flow of unheated air flowing through said air flow duct, a second intermediate position substantially preventing air flowing through said heating unit and a third position allowing unheated air to pass through said heat unit and additional unheated air to pass through said air flow duct to maximize a flow of unheated air; and
- a control member for controlling the heating unit between an on and off mode directly in response to a position of said mixing shutter, whereby when said mixing shutter is in one of said second position and between second and third positions said control member turns off said heat unit, and when said mixing shutter is in one of said first position and between said first and second positions said control member turns on said heat unit.

* * * * *